May 27, 1958 K. E. BUCKMAN 2,836,302
FLUID FILTERS
Filed March 28, 1955 3 Sheets-Sheet 3
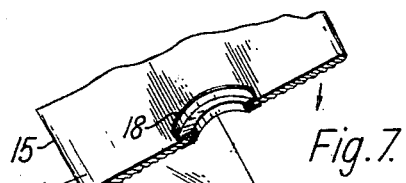
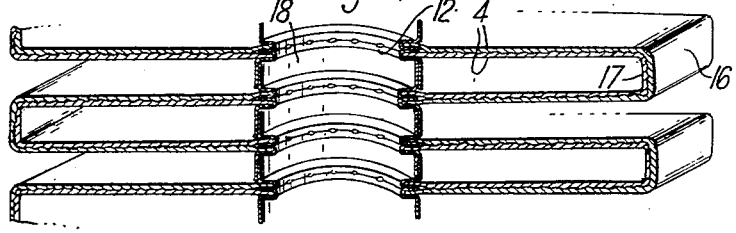
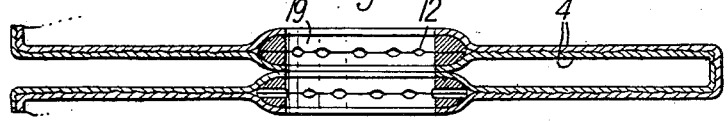
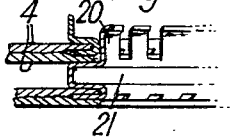
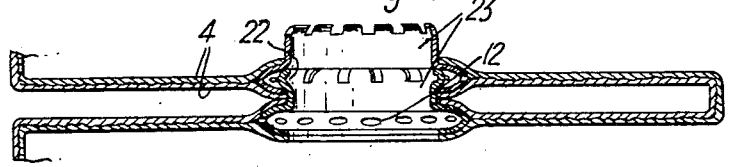
Inventor
Kenneth Ernest Buckman
By H. E. Jones
Attorney 2,836,302

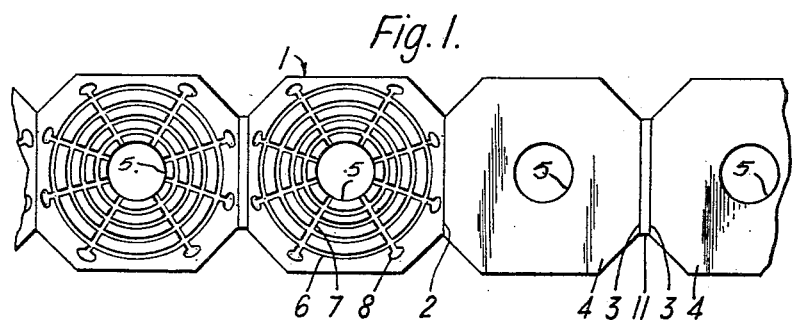
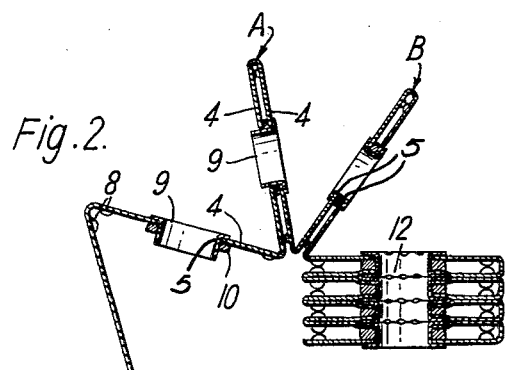
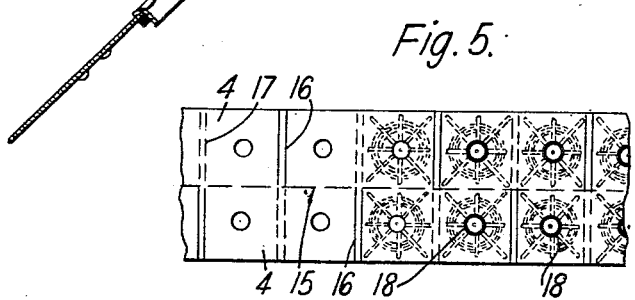
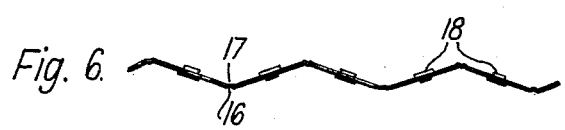

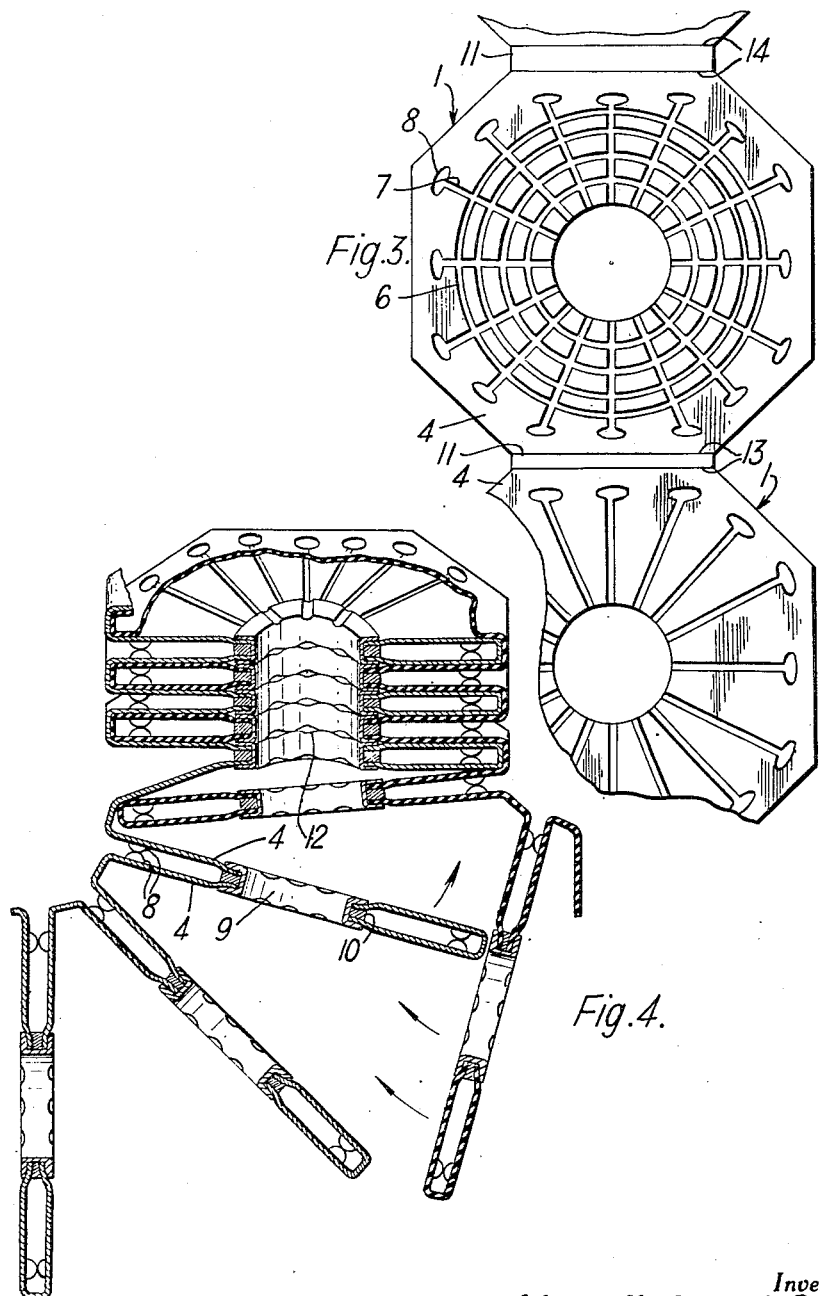

FLUID FILTERS

Kenneth Ernest Buckman, Redbridge, Southampton, England, assignor to General Motors Corporation, Detroit, Mich., a corporation of Delaware Application March 28, 1955, Serial No. 497,271

Claims priority, application Great Britain April 22, 1954

8 Claims. (Cl. 210—493)

This invention relates to fluid filters.

In particular the invention relates to filter units of so-called "zig-zag" form.

By the invention there is a filter unit which combines the advantages of uniform precipitate spaces with ease and economy of manufacture.

According to the invention a fluid filter unit comprises a continuous strip of filter material divided by fold lines into sections arranged in "zig-zag" manner, each section being centrally apertured and adjacent sections being sealed together in successive pairs at the central apertures.

One such unit can be interleaved with another unit so as to reduce the amount of external sealing between adjacent sections.

The scope of the invention is indicated by the appended claims; and how it can be carried into effect is hereinafter particularly described with reference to the accompanying drawings in which:

Figure 1 is a plan of a blank for a filter unit;

Figure 2 is a sectional elevation showing how the blank of Figure 1 is folded to form the filter unit;

Figure 3 is a plan of another form of blank for a filter unit;

Figure 4 is a sectional elevation showing how two blanks of Figure 3 are folded to form the filter unit;

Figure 5 is a plan of a further blank;

Figures 6, 7 and 8 show stages in the folding of the blank of Figure 5 to form a filter unit; and Figures 9, 10 and 11 show different forms of spacer elements for use in the filter units made as shown in Figures 1 to 8.

Figures 1 and 2 show an embodiment of the invention in which a continuous strip 1 of filter material, e. g., resin impregnated filter paper, is marked out with fold lines 2, 3 which are alternately single and double respectively and the equal sections 4 between the fold lines 2, 3 are centrally apertured at 5. The sections may be of square or, as shown, of other polygonal shape. The sections 4 are stamped or embossed with a pattern of circular and radial grooves 6, 7 and a circle of spaced indentations 8 is formed at the outer periphery of each section 4. A clamping member in the form of a flanged clamping ring 9 (Figure 2) is inserted into the aperture 5 in one section 4 and from the other side of the section a spacer washer 10 is passed over the clamping member 9. As each fold is completed as shown at A, Figure 2, the aperture 5 in one section 4 of the paper passes over the clamping member 9 and a further flange is formed on the part of the clamping member 9 which is passed through both apertures 5 and the washer 10, thereby clamping the two sections 4 together in sealed relationship with the washer 10 interposed between them as shown at B, Figure 2. The two circles of indentations 8 abut and the material 11 between the pair of fold lines 3 acts as a joining and spacing wall for the two sections 4 of each fold to form a pair of sections. Adjacent sections present grooves 6 and 7 or channels between adjacent pairs of sections. The outer edges of adjacent sections 4 of adjacent pairs abut and are sealed by adhesive, or mechanically, as by crimping, or by endwise pressure applied to the unit, or any combination thereof in the forming of a stack or filter unit.

Fluid flow through the filter unit thus formed is from the outer periphery into each pair of sections and between the spaced knobs determined by the indentations 8 of each section 4, through the filter paper into the grooves 6, 7 between adjacent pairs of sections and radially along the grooves 7 to radial channels 12 formed between the clamping members 9, and thence axially of the unit and out at one end.

The sealing at the central apertures 5 may, alternatively be by mechanical sealing such as crimping, or by endwise pressure, adhesive, or simply by close fitting spacer members.

The filter unit of this invention has particular utility in the filtration of lubrication oil in internal combustion engines and like machines.

In the alternative embodiment of the invention shown in Figures 3 and 4, the filter units are formed as above described except that the fold lines are all marked out as alternate pairs of spaced fold lines 13 and 14, the spacing between lines 14 being greater than that of lines 13, and the sections of the "zig-zag" filter unit being separated one from another by walls formed by the material 11 between lines 13 and 14. The "zig-zag" unit is interleaved, as shown in Figure 4, with another similarly formed "zig-zag" unit so that each pair of sealed sections 4 of one unit lies between two pairs of sealed sections 4 of another unit.

Where the sealed sections abut the outer peripheral parts are sealed; only the edges not including the fold lines 13, 14 of each pair of adjacent sections have to be so sealed.

In a further embodiment of the invention shown in Figures 5, 6, 7 and 8 the continuous strip 1 of filter material is marked out with a central longitudinal fold line 15 and transverse spaced pairs 16, 17 of fold lines, the fold lines 16 being embossed to a greater depth to assist even folding. The pairs of side-by-side sections so formed are, as in the constructions previously described herein, centrally apertured at 5 and embossed with circular and radial grooves 6, 7. Ferrules 18 (Figures 7 and 8) are inserted in each of the apertures 5 and clamped to the inner peripheral part of each section 4 and the strip is folded about the longitudinal fold line 15. The outer edges of the double layer of filter material are sealed by adhesive. This double strip of material is then folded in "zig-zag" manner at the fold lines 16, 17 so that adjacent ferrules 18 meet and act together as spacing and sealing members as shown in Figure 8. Because of the double thickness of filter material the sections are self-supporting and do not require the spacing indentations 8, only the circular and radial grooves 6, 7 being provided.

The form of the spacing and sealing members can be varied and the members can be retained in position by adhesive as with the member 19, Figure 9; or, as shown in Figure 10, teeth 20 can be formed in the members 21 and clamped over the inner peripheral parts of the pairs of sections 4.

Figure 11 shows a further alternative form of spacer member in which teeth 22 are formed in members 23 and are deformed to engage within and secure an adjacent member.

As a further alternative the inner peripheral portion of each section may be formed with an integral flange at right angles to the plane of the section, the flange of one section being formed so as to fit into that of an adjacent section and thereby space the two sections, the interfitting flanges also ensuring sealing of the inner peripheral portions when axial pressure is applied to an assembly of such sections.

I claim:

1. A fluid filter unit formed of a continuous strip of filter material folded into sections, the latter being in a zigzag arrangement forming a stack, each of said sections having a central aperture, adjacent sections of successive pairs of said sections being in sealed relation at their peripheries, indentations in said sections defining flow passages for filtrate between said pairs, ridges determined by said indentations spacing the sections of each pair, and means associated with said sections to seal each pair of sections together around their apertures and defining radial passages leading from said filtrate flow passages.

2. A fluid filter unit formed of a strip of filter material folded into sections, the latter being in a zigzag arrangement to form a stack, said sections having aligned apertures, adjacent sections of successive pairs of said sections being in sealed relation at their peripheries, filtrate flow passages defined by said material between adjacent pairs of said sections, ridges formed in said material spacing the sections of each of said pairs, and annuli associated with said sections to seal the sections of each pair around the apertures of the sections and defining radial passages leading from said filtrate flow passages.

3. A fluid filter unit formed of a continuous strip of filter material folded into sections, the latter being in a zigzag arrangement forming a stack, each of said sections having a central aperture, adjacent sections of contiguous pairs of said sections being in sealed relation at their peripheries, said sections being imperforate except for said apertures, flow passages formed in said material between said pairs, ridges formed on said strip spacing the sections of each pair, and means associated with said sections to seal the sections of each pair together around their apertures and to define radial passages leading from said flow passages.

4. A fluid filter unit formed of two continuous strips of filter material, each of said strips being folded into sections in a zigzag arrangement, each of said sections having a central aperture, the sections of one of said strips being formed into pairs alternating with pairs of sections of the other of said strips and thereby forming a stack, means associated with each pair of sections to seal around the apertures thereof and defining radial passages, the sections of at least one of said strips having indentations and cooperating with the sections of the other of said strips to define flow passages communicating with said radial passages, and ridges determined by said indentations serving as spacing means in the sections in which the indentations are formed.

5. A method of forming a filter unit from a continuous strip of filter material by marking out transverse fold lines thereon to divide the strip into pairs of sections, forming a central aperture in each section and a pattern of grooves in at least every other pair of sections, folding said strip about a central longitudinal axis, sealing the inner peripheral parts of each of said pairs of sections around their apertures, and folding the strip at the said fold lines in alternate opposite directions to form a stack of sections in zigzag arrangement.

6. A method of forming a filter unit from a continuous strip of filter material by marking out transverse fold lines thereon to divide the strip into pairs of sections, forming a central aperture in each section and a pattern of grooves in at least every other pair of sections, folding said strip about a central longitudinal axis, sealing the outer edges and inner peripheral parts of said pairs of sections around their aperture, and folding the strip at the fold lines in alternate opposite directions to form a stack of said pairs of sections in zigzag arrangement.

7. A method of forming a filter unit from a continuous strip of filter material by marking out transverse fold lines thereon to divide the strip into a plurality of sections, forming a central aperture in each section and a pattern of grooves in at least every other section, folding the sections at the fold lines in alternate opposite directions to form a zigzag arrangement, sealing the inner peripheral parts of successive pairs of adjacent sections around said apertures and interleaving one such folded strip with a further similarly folded strip in assembling said unit in the form of a stack.

8. A method of forming a filter unit from a continuous strip of filter material by marking out transverse fold lines thereon to divide the strip into pairs of sections, forming a central aperture in each section and a pattern of grooves in at least every other section, folding the sections at the fold lines in alternate opposite directions to form a potential zigzag arrangement with a spacing wall separating the sections in each pair, sealing the inner peripheral parts of each pair of adjacent sections around the apertures of the latter, and assembling said pairs as folded into a stack.

References Cited in the file of this patent

UNITED STATES PATENTS 2,359,475     Gauthier     Oct. 3, 1944

FOREIGN PATENTS 710,621     Great Britain     June 16, 1954